June 2, 1931. H. L. SYMONS 1,807,808
EMULSION AND PROCESS THEREFOR
Filed June 25, 1923 3 Sheets-Sheet 1

Fig.1.

INVENTOR
Harry L. Symons
BY Charles H. Kesler
ATTORNEY

June 2, 1931.  H. L. SYMONS  1,807,808
EMULSION AND PROCESS THEREFOR
Filed June 25, 1923   3 Sheets-Sheet 2

Fig. 2.

INVENTOR
Harry L. Symons
BY
Charles H. Kesler
ATTORNEY

June 2, 1931.  H. L. SYMONS  1,807,808
EMULSION AND PROCESS THEREFOR
Filed June 25, 1923   3 Sheets-Sheet 3

INVENTOR
Harry L. Symons
BY
Charles H. Kesler
ATTORNEY

Patented June 2, 1931

1,807,808

UNITED STATES PATENT OFFICE

HARRY L. SYMONS, OF WIMBLEDON, LONDON, ENGLAND, ASSIGNOR TO ROADS COLLOIDAL, LIMITED, OF LONDON, ENGLAND

EMULSION AND PROCESS THEREFOR

Application filed June 25, 1923. Serial No. 647,421.

My invention relates to improvements in emulsions, and the same has for its object to provide a simple, efficient and reliable composition which can be manufactured in quantity and at a low cost, and which may be employed for treating roads, mines, railways and the like for laying dust and for other purposes.

Further, said invention has for its object to provide a composition which, when applied to a surface, will prevent the dispersion of dust already formed thereon and will retard the formation of the same by attrition.

Further, said invention has for its object to provide a composition which may be conveniently handled and conveniently and efficiently applied to the surface to be treated.

Further, said invention has for its object to provide a composition in which the dust-laying oil and binding substance therein are in a colloidal or emulsified condition dispersed through water and to which additional quantities of water may be added as the same is to be used.

Further, said invention has for its object to provide a composition in which a dust-laying oil and bituminous binding material are in a colloidal or emulsified condition dispersed through a quantity of water and which permeates the surface to which it is applied, the water evaporating, leaving the other materials upon and within the surface, thinly and evenly distributed.

Further, said invention has for its object to provide a composition in which the components thereof will remain stable and emulsified for a considerable period of time under normal or average atmospheric conditions.

Further, said invention has for its object to provide a composition of oil and bituminous substance in an emulsified condition in water which may be applied like water to a surface, forming a protection therefor which is clean and which will not inconvenience traffic or be a nuisance thereto.

Further, said invention has for its object to provide a process whereby the said composition may be manufactured in large quantities and at low cost.

Further, said invention has for its object to provide a process whereby emulsions may be manufactured commercially by the mechanical disintegration of oils.

Further, said invention has for its object to provide a process in which oils and bituminous substances may be conveniently handled, proportioned and emulsified.

Further, said invention has for its object to provide a continuous process for the manufacture of emulsions containing mineral oils and bituminous substances.

Further, said invention has for its object to provide a process for disintegrating or emulsifying oils in water by running the same through a small clearance between rapidly rotating members.

Further, said invention has for its object to provide a stable emulsion of oil and a bituminous substance in water by a process which is continuous and which mechanically emulsifies the same, enabling the production at low cost of large quantities of an emulsion suitable for roads, mines and the like, and which can be easily and efficiently applied to the surfaces thereof.

Other objects will in part be obvious, and in part be pointed out hereinafter.

To the attainment of the aforesaid objects and ends, my invention consists in the successive steps constituting the process and in the composition or product resulting therefrom, as hereinafter more fully described and then pointed out in the claims.

In the accompanying drawings forming part of this specification, wherein like numerals of reference indicate like parts.

Figure 1:
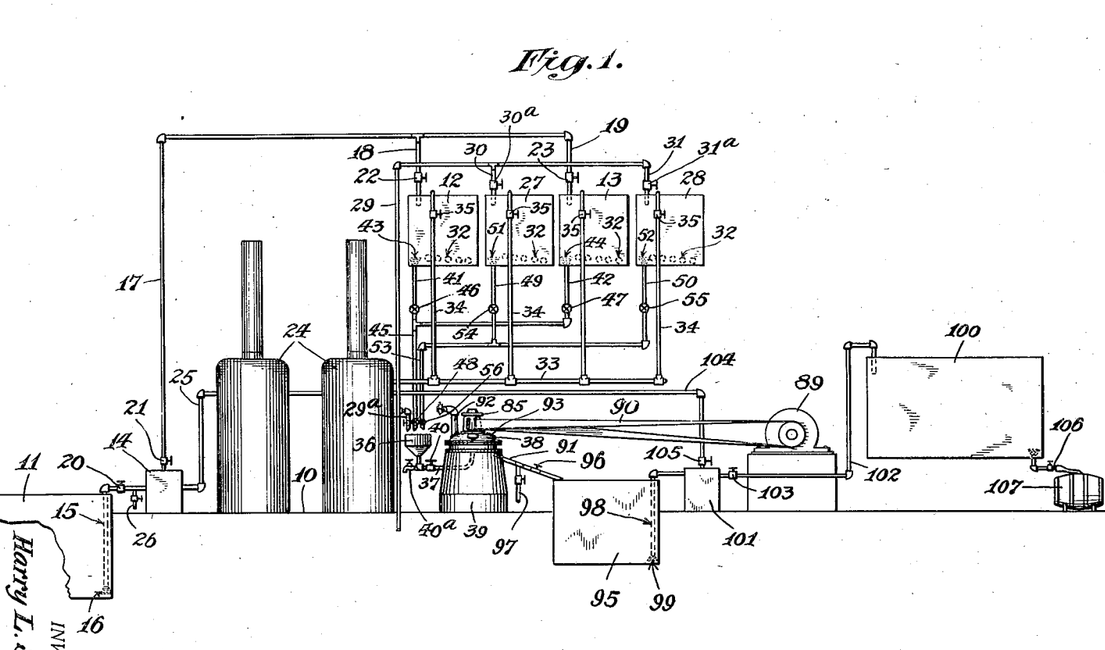
Figure 1 is an elevation, somewhat diagrammatical, showing one form of apparatus which may be employed in carrying out the process of my said invention.

Referring to Fig. 1, an apparatus or installation (such as is actually in use at the moment) for performing the process of the present invention will first be described. The approximate grade level or floor of the plant is indicated by the line 10. At the left is illustrated a tank 11, which is used for the storage of the raw oil. In actual practice, for the installation now in use, this tank 11 has a capacity of 4,000 gallons. Tank 11 may be located either on grade level, as shown, or elevated above the level of the heating tanks 12 and 13 to be described. Where the latter arrangement is employed, the oil may then flow by gravity from the tank 11, as required, into the elevated oil heating tanks 12 and 13. However, the arrangement shown is better for gravity flow from the distributing lorries when the distributors supplying the oil in bulk have not the necessary pumps attached to their distributing tank lorries for pumping the oil into an elevated tank. With the tank arranged as shown, the oil is pumped into the elevated heating tanks 12 and 13 by means of a pump 14. If tank 11 be elevated, arrangements can be made to pump the oil from the tank delivery wagon by using the pump 14 and necessary lengths of flexible tubing. For pumping the raw oil from tank 11 into tanks 12 and 13, a pipe 15 extends into tank 11, with its lower end 16 near the bottom thereof and in communication at its upper end with pump 14. The oil is forced by pump 14 through a delivery pipe 17 and the branches 18 and 19 thereof into the elevated oil heating tanks 12 and 13. The pipe 15 is controlled by a valve 20; the pipe 17 is controlled by a valve 21; and the branches 18 and 19 are controlled by valves 22 and 23.

The pump 14 is preferably steam-operated, although other types of pumps may be employed, the necessary steam for the same being generated by means of the vertical boilers 24, which are connected to the pump 14 by means of a pipe 25.

A valve-controlled drainage pipe 26 is shown communicating with the tank 11.

By the above-described arrangement, the oil in the tank 11 may be elevated as desired to fill the tanks 12 and 13 upon the starting of the pump 14, which is controlled by the valves 20 and 21.

Alternating with the tanks 12 and 13 are elevated heating tanks 27 and 28 for the water and emulsifying agent. A water pipe 29, for supplying fresh water from a source of supply to the tanks 27 and 28, extends above the same and terminates in branches 30 and 31, provided with valves 30a and 31a, for regulating the supply of fresh water thereto. In the bottoms of the tanks 12, 13, 27 and 28 are steam coils 32 for heating the contents thereof. A steam main 33 in communication with the boilers 24 is connected to the coils 32 through branches 34, each branch 34 being controlled by a suitable valve 35 for shutting off the steam to the coil 32.

The tanks 12 and 27 constitute one set, and the tanks 13 and 28 another, and the contents thereof are alternately run into the emulsifying mill. By suitable adjustment of the valves, one set of tanks can be filled and heated while the contents of the other set are being emulsified.

The heating tanks 12, 13, 27 and 28, in the installation actually in use, have a capacity of 800 gallons each, and are fitted with 65 lineal feet of 2-inch steam coil. These tanks are located well above the level of the emulsifying mill, the tanks 12 and 13 receiving the raw oils from tank 11 and the binding material, such as bitumen, etc., as hereinafter described, and the tanks 27 and 28 receiving water and a dispersator, stablizer or emulsifying agent. The steam, after circulating through the heating coils 32, passes through a steam trap back to a condenser steam main. Such construction, however, being well known and forming no part of the present invention, has not been illustrated.

All of the heating installation should be properly and effectively covered with asbestos cement or similar preparation, and the heating tanks carefully boxed in with light boarding, providing 2-inch space, which is packed with saw-dust and fine dry cinders. The boiler service is thereby made more efficient and economical and the process can be more rapidly performed.

Mounted above the floor 10, below the heating tanks, at such an elevation that the employees or workmen may conveniently observe the same and make adjustments, is a proportioning hopper or member 36. This hopper 36 is provided for the purpose of receiving the heated contents from either set of tanks 12 and 27 or 13 and 28, and proportioning the same for entry into the emulsifying mill. The hopper 36 at its lower end communicates, through a pipe 37, with an emulsifying mill 38, mounted upon a concrete base 39, the supply of material or liquid to the mill being controlled by a valve 40 in the pipe 37. A faucet 40a is also connected to pipe 37 to permit a portion of the liquid to be taken therefrom for testing purposes. The contents of tanks 12 and 13 are delivered into hopper 36 through branch pipes 41 and 42, having the upper ends 43 and 44 of the same located within the tanks 12 and 13 near the bottom thereof and connected at the opposite ends of the same by a common pipe 45, with the lower end of the same located above hopper 36. The branch pipes 41 and 42 are controlled by the valves 46 and 47 therein, and the common pipe 45 has a valve 48 located therein conveniently above the hopper 36. The contents of tanks 27 and 28 are delivered into hopper 36 through branch pipes 49 and 50, having the upper ends 51 and 52 of the same located within the tanks 27 and 28 near the bottom thereof and connected at the opposite ends thereof by a common pipe 53, with the lower end thereof located above the hopper 36. The branch pipes 49 and 50 are controlled by valves 54 and 55, and the common pipe 53 is controlled by a valve 56 conveniently located above the hopper 36.

The hopper 36 (Figs. 2 to 4) comprises a cylindrical upper portion and a conical lower portion, communicating with the mill 38 through pipe 37. A proportioning member 57, comprising a tray-like receptacle, is mounted within the hopper 36 and supported therein by means of hooks 58 thereon extending over the upper edge thereof. The tray 57 is circular at the rear to permit the same to fit the corresponding surface of hopper 36, and has a flat vertical wall 59 at the front providing a space between the same and the adjacent portion of the hopper in front thereof to permit the flow of liquid therefrom. The bottom 60 of the tray 57 curves upwardly at the rear to permit the same to be easily removed from the hopper, and is spaced upwardly above the level of the lower end of the cylindrical portion of the hopper 36. The receptacle 57 is divided by means of a vertical pratition 61 into two separate compartments 62 and 63, one located below pipe 45 and the other below pipe 53, to receive the respective liquids conveyed thereby, and so proportioned in cross-section as to permit the liquids from the tanks to flow thereinto in the required proportions for emulsification, as hereinafter described. As illustrated, the compartments 62 and 63 are of equal volumes, permitting the combination of the liquids in equal proportions. The wall 59 has two V-shaped openings 64 and 65 therein, communicating with compartments 62 and 63, respectively. The openings 64 and 65 are proportioned to permit the liquids to flow therethrough in the required proportions and, as illustrated, are of equal sizes. Each opening 64 and 65 is closed by a slide 66 guided in the guideways 67 and having a handle 68 at the upper end of the same to lift the same out of the guideways 67 and to replace the same. If so desired, the openings 64 and 65 may be graduated, as shown, to enable the easy observation of the levels of the liquids as the same flow through the openings into the hopper. The conical portion of hopper 36 is divided by means of a vertical partition 69 into separate portions or passages to maintain the liquids flowing through the openings 64 and 65 separated after the same enter the hopper 36. Partition 69 is spaced below the tray 57 in substantially the same plane with partition 61 thereof, and with its upper edge 70 flush with the upper end of the conical portion of hopper 36, as shown. The lower edge 71 of the partition 69 is spaced upwardly from the inlet to the pipe 37, the passages upon opposite sides thereof communicating with each other at this point, permitting the liquids to combine below edge 71 as the same enter the pipe 37. In practice, the flow of liquids into the hopper is adjusted to maintain the heads thereof slightly below the upper edge 70 of the partition 69. Hence, even after entering the hopper, the same are maintained separate until entering pipe 37.

Figure 2:
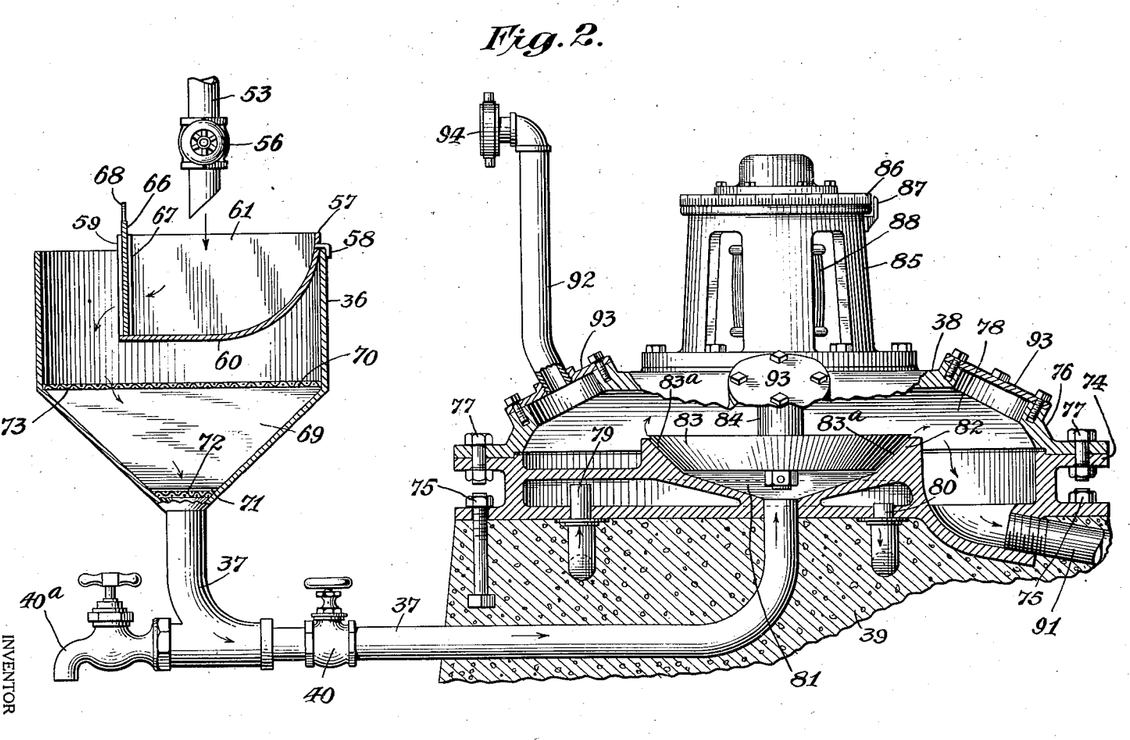
Fig. 2 is an enlarged elevation of a portion thereof, with parts in section and with parts broken away, and illustrating a proportioning hopper or member and emulsifying mill.
Figure 3:
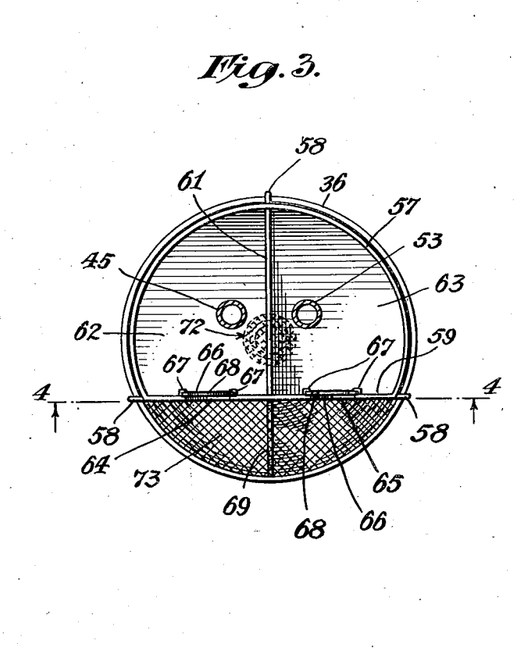
Fig. 3 is a plan view of the proportioning hopper.
Figure 4:
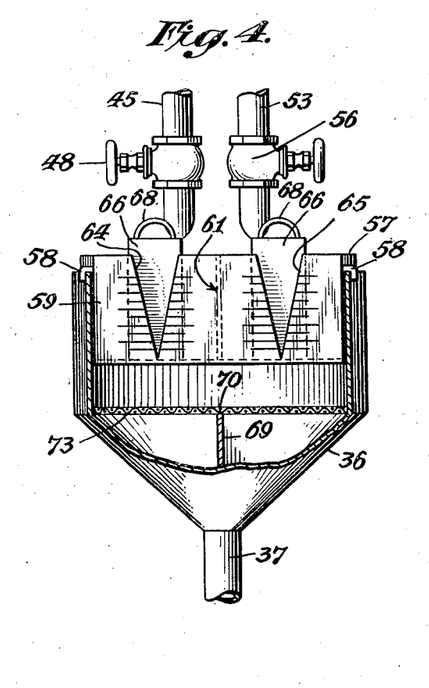
Fig. 4 is a sectional elevation thereof on the line 4—4 of Fig. 3, looking in the direction of the arrows.

A fine mesh gauze or screen 72 is located above the mouth of the pipe 37, while a similar screen 73 is mounted upon the upper edge of the partition 69 below the member 57 to prevent the passage of foreign or extraneous matter into the mill with the liquid. A valve-controlled pipe 29a connected to the water supply pipe 29 extends above hopper 36 to permit the same to be flushed out.

The ends 16, 43, 44, 51 and 52 of the several pipes within the tanks from which liquid is to be taken should also be provided with gauze sieves of sufficiently fine mesh for the same purpose, thereby preventing pump and mill troubles through clogging, etc.

The mill 38 (Fig. 2) comprises a lower casting 74, secured to the concrete base 39 by means of bolts 75, and an upper casting 76, secured to casting 74 by bolts 77, and forming therewith an interior chamber or enclosure 78. The mill may be preliminarily heated or continuously heated while operating by admitting steam thereto through the pipe or inlet 79 and removing the same through the outlet 80, or other means may be employed for heating the same. The pipe 37 enters centrally through the bottom of the casting 74 into a dish-shaped space 81 therein. The upper inner surfaces of the walls 82, defining said space 81, extend upwardly and outwardly and constitute a stationary annular frusto conical member concentric with and cooperating with a rotatable frusto conical disc-like member 83 therein, providing a small annular clearance 83a therebetween, diverging upwardly and outwardly, and communicating with the chamber 78, in the lower portion of which said members are located. The member 83 is secured to a shaft 84, which extends upwardly through a lower bearing in the casting 76 and has an upper bearing in a spider or member 85 mounted on casting 76. The shaft 84 may be adjusted vertically with the upper bearing of the same by means of a micrometer head comprising relative rotatable elements 86 and 87 (not illustrated in detail), thereby adjusting the size of the clearance 83a as the frusto conical members move axially relatively to each other. The member 83 is rotated by means of a pulley 88 on shaft 84 driven by a motor 89 (Fig. 1) through a belt 90. The material or liquids, after passing through the clearance 83a into chamber 78, escape therefrom through an outlet 91.

Means is also provided for maintaining the pressure of the air within the enclosure 78 at substantially that of the surrounding atmosphere above the hopper during the operation of the mill. This means comprises a pipe 92 communicating with the interior 78 of the mill through an air port cover 93, preventing air-locking, bumping and insuring the easy operation thereof. The covers 93 permit access to the interior of the mill to gauge the adjustment of the clearance 83a and to permit the same to be washed out and heated therethrough. The outer end 94 of the pipe 92 has an overflow opening, to which a hose may be connected for receiving any abnormal overflow ejected from the mill consequent upon air-lock or overload.

The hopper 36 is located at a slightly higher elevation than that of the relatively rotatable members 82, 83, so that when the same is filled with liquid to a level with the upper edge 70 of partition 79, there will be provided a head of liquid above the level of said members tending to force the same through clearance 83a and preventing the admission of air therethrough. This head of liquid, together with the provision of pipe 92, maintains a steady feed or flow of liquid into the mill and prevents air-locking and bumping, insuring the easy operation thereof.

The members 82 and 83 are very accurately made to fine limits, and the adjacent surfaces thereof, constituting the walls of clearance 83a, the substantially smooth. While other types of mills may be employed (for instance, the "Plauson" comprising relatively rotating members having a small clearance between the same), yet the mill illustrated forms a better product, and the same may be accurately adjusted to secure the required clearance for optomum emulsification, as hereinafter described. The member 83 rotates at a high speed, and it has been found, as hereinafter described, that the speed at which the same rotates is important in order to obtain an optimum product.

The material acted upon by the mill 38 is conducted through the outlet or a pipe 91 into a tank 95 (Fig. 1), located at a level below the mill, and permitting the liquid emulsified by the mill to flow thereinto by gravity. The pipe 91 is controlled by a valve 96, and a valve-controlled branch 97 therefrom is provided for the purpose of draining the pipe 91 and also to permit the drawing off of the material for the purpose of testing the same. The tank 95 should be of a minimum size, double the cubic contents of either pair of heating tanks. The purpose of tank 95 is for the testing of the emulsion before its final reception in the market storage tank. Should the emulsion prove unsuitable, it may be by-passed into any convenient tank and the raw materials reclaimed or retreated. After the testing of the same, if the material is found satisfactory, it is pumped from the tank 95 through a pipe 98, with the lower end 99 of the same adjacent to the bottom of tank 95, and protected by a screen or sieve, into the market storage tank 100. For this purpose, the pipe 99 is connected to a steam or other pump 101, from which the material is forced into tank 100 through pipe 102, having a valve 103 therein. The pump 101, which is steam-operated and similar to that already described, is connected to the steam supply through the pipe 104 controlled by valve 105. From the tank 100, the finished material is racked off, through a valve-controlled pipe 106, into a barrel 107, ready for shipment.

The tanks described are all preferably tilted towards the outlet corner or end, a matter of two or three inches, for the purpose of facilitating the cleaning of the same and securing the maximum quantity of contained oil.

One process, performed according to and embodying my said invention, by way of example, is substantially as follows:

Into the oil heating tank 12 (or 13) is pumped from the tank 11 substantially 480 gallons of green tar oil, valves 23 and 46 being closed and valves 20, 21 and 22 being adjusted to permit the flow of liquid. Mixed with this oil in the tank 12 are 120 gallons, or approximately 1,200 lbs., of bitumen, the oil and bitumen constituting the dispersed or dispersable phase. The bitumen, supplied in barrels, is unstaved, broken up by hand, weighed, checked, lifted by a pulley to the heating platform, and lowered into the tank 12 in its original form. The bitumen with the oil makes a total of 600 gallons in the tank, which, allowing for the displacement made by the steam coils 32 therein, provides a convenient quantity with which to work. If so desired, the bitumen may be heated and liquefied separately before it is placed in the tank with the oil, mixing the same with the oil while in a liquid condition. From pipe 29, into the tank 27 (or 28), is now run 588 gallons of fresh water, the valves 31a and 54 being closed and valve 30a open. To this, 12 gallons (or approximately 120 lbs.) of sodium oleate (the emulsifying agent) is added, the water constituting the continuous phase. Heat should now be applied by admission of steam to the tanks 12 and 27 containing the liquids. This is done by turning valves 25 and 35, and the temperature of the oil and bitumen in the tank containing the same should be brought to and maintained at approximately 100° C., and the temperature of the tank containing the sodium oleate and water should be brought to and maintained at a temperature of approximately 98° C. The values of temperatures given enable the optimum solution of the bituminous content in the oil without causing the flashing thereof and the optimum solution of the emulsifying agent in the water. The temperatures of the two liquids being substantially equal, permit the same to safely mix when combined in hopper 36. The heating of the tanks should be continued for about one hour, or until the substances are thoroughly liquid and homogeneous. The bitumen upon heating becomes homogeneous with and dissolved or dispersed through the green tar oil, and the sodium oleate becomes homogeneous with and dissolved in or dispersed through the water. Mechanical stirring may be applied to facilitate the mixing operations, if so desired.

The mill, having been thoroughly cleaned, warmed with live steam to about the temperature of the liquids, run about five minutes to counteract expansion, and the clearance 83a between the members 82 and 83 having been set at the required value, as hereinafter described, the motor is started. The valves 46 and 54 are now opened and the valve 40 closed. The valves 48 and 56 are then gradually opened above the proportioning hopper 36, the same having been previously marked so that both compartments 62 and 63 of the tray 57 of the hopper fill at approximately the same rate in equal volumes and at the approximate maximum rate of flow satisfactory to the production of stable emulsion subject to the mill's capacity. The sliding panels 66 are then raised and the heated raw materials allowed to fill the hopper 36 upon opposite sides of partition 69 until the same nearly fill the conical portion thereof. The valve 40 is now opened to the required extent and the combined liquids pass into the mill 38 at a temperature of about 75° to 85° C., to which the same have meanwhile fallen by radiation, through the clearance 83a, in the desired proportions (for one product, light in bitumen content) of 49% water, 1% dispersator or emulsifying agent, 40% green tar oil and 10% bitumen. The attendant can note if these proportions are being maintained by observing the levels of the liquids as the same issue through openings 64 and 65, and may insert panels 66 from time to time to note if the liquids are entering the compartments 62, 63 at the same rate. From the mill, where the oil and bitumen is thoroughly emulsified in the water and emulsifying agent, the finished product flows by gravity into the catch tank 95.

The tank 95 is for the purpose of catching one whole run from any two heating tanks 12 and 27 or 13 and 28, so that if there are any faults in the materials or manufacture, the particular lot may be by-passed into other tanks (not illustrated, but which may be easily arranged) and not allowed to injure the supply of material already in the market storage tank 100 or hold up further production. This product in the tank 95 is now analyzed by the chemist, and if found unsatisfactory is retracted by repassing the same through the mill or the raw materials reclaimed. The material treated by the mill 38, if satisfactory, is pumped into the market storage tank 100, which should be of a suitable size and positioned according to the requirements or conditions.

If necessary, the tank 100 may be occasionally and as required agitated by steam nozzles from a steam main by means of piping therein, the nozzles being placed approximately every four feet. This is for the purpose of keeping the emulsion from freezing in the event of severely cold weather and for redistributing any heavy material which may not have been properly emulsified but which is in sufficiently small quantities as not to materially affect the final product when placed in the barrels 107, into which the material is racked off by ordinary methods and shipped out for consumption.

In marketing the product in barrels and containers, the latter should be carefully steamed, cleaned and inspected before filling and should preferably be treated with a mixture of water and caustic soda to thoroughly cleanse the same. I find metal containers best.

After the tanks 12 and 27 are filled and heated and the contents of the same are being run through the mill, the tanks 13 and 28 are then filled and heated, the contents thereof being ready for treatment in the mill after the contents of the first set of tanks are emulsified. Thereupon the first set of tanks is filled and heated, the process being continuous.

With an equipment of the size above mentioned, which is now in actual use, the plant would have a capacity of 6,000 gallons per 8-hour day. This means 1½ hours for each run of 1,200 gallons to fill, heat and run through the mill and allowing for stoppages and unforeseen contingencies. The above production is possible by using two sets of heating tanks, tanks 12 and 27 and tanks 13 and 28, as shown, the mill 38 being designed, for the production stated, to have a capacity of 1,000 gallons per hour.

The mill actually employed to obtain the above-mentioned production had a member 83 with a top diameter of approximately 15 inches and a bottom diameter of approximately 11 inches, the member 83 being about 2 inches thick and the clearance 83a between the members 82 and 83 being about 3 inches long. The mill 38, however, may be of any suitable size according to the production required.

One run of the liquids through the mill is usually sufficient in the process above described, especially when passed therethrough in a heated condition. After use, the mill 38 should be thoroughly cleansed by running water and dispersator through the same and finally water alone until thoroughly clean.

The level or head of the liquid in the hopper 36 is maintained above the level of the member 83, providing a head of liquid, tending to force the material through the clearance 83a between the members 82 and 83 and providing a liquid seal, preventing the admission of air to the chamber 78 and, in cooperation with the maintenance of atmospheric air pressure within the chamber 78 by the pipe 92, permitting the mill to run smoothly at full load.

In adjusting the flow of the liquids into the hopper 36, the delivery pipes 45 and 53 from the raw oil and dispersator heating tanks meet just above the tray, one pipe per compartment. The valves 48 and 56 are conveniently located above the hopper. These valves should be slowly opened at the same time, the raw materials flowing into the two compartments. The valves may be marked roughly when the liquids in the two compartments are rising at the same rate and are being maintained substantially at equal levels. When the valve adjustment has been obtained, the traps or slides 66 are then simultaneously opened and the proper quantities allowed to flow into the hopper 36, where the same are maintained separate until entering pipe 37, thus insuring the combination thereof in the required proportions for emulsification. Whether or not the flow is being maintained in equal proportions will be roughly determined by noticing the elevation of the liquids as the same come through the openings 64 and 65. The elevation of one should be substantially that of the other. Some little adjustment will be required before the valves can be marked roughly to show whether the mill is being properly supplied with the liquids and in the required proportions. The systems, however, can soon be adjusted to run continuously and automatically and to combine the liquids while running, permitting the proper proportioning of immiscible liquids which are more or less viscous and do not mix. The slides 66, however, should be dropped from time to time to note the rise of liquids in the compartments and to determine if the same are entering at the same rate and are being maintained at equal levels.

The quality of the final product depends to a certain extent on the temperature at which the mixture is passed through the mill, although when the oil and bitumen are thoroughly mixed, the same may be emulsified when cold. For the composition comprising the ingredients as above specified, the liquids should preferably be at a temperature of approximately 75 to 85° C. when acted upon by the mill and passed therethrough once.

The speed of the mill and the clearance between the members 82 and 83 is also important. For instance, it has been found, for the product as above described, that a clearance of 10/1000ths of an inch at 4,500 revolutions per minute was not as effective as one of 15/1000ths of an inch at the same speed. Nor did a speed of 3,500 revolutions per minute and a clearance of 5/1000ths of an inch give as good results as a speed of 4,500 revolutions per minute and a clearance of 15/1000ths of an inch. As at present determined, for the above-described product, a speed of roughly 4,500 revolutions per minute with a clearance of 15/1000ths to 20/1000ths of an inch is the best. These values will vary, however, with variations in the product, as hereinafter described, the clearance range being from 5/1000ths to 25/1000ths of an inch and the speed range being from 3,000 to 5,000 revolutions per minute.

The ingredients and proportions thereof employed in the above-described process may be varied (within limits) according to requirements and conditions and according to the properties desired in the product or composition produced; the ingredients and proportions thereof above given in describing the process being by way of example. For instance, products in the following proportions by volume have been successfully manufactured by the above-described process:

|  | A | B | C | D |
|---|---|---|---|---|
|  | Per cent | Per cent | Per cent | Per cent |
| Bitumen | 15 | 20 | 25 | 30 |
| Oil | 35 | 30 | 50 | 45 |
| Water | 50 | 50 | 25 | 25 |

The oil is preferably green tar oil as meeting the requirements for an efficient product. The precentage of emulsifying agent is included in the percentages given for water. The percentage of bitumen or other bituminous or binding substances varies with the requirements for the dust preventative material; the larger the percentage thereof, the greater will be the binding properties of the composition or product.

Emulsions of mixtures of mineral oil and bituminous substances containing more than approximately 40% or 45% by volume of bituminous substance in said mixture have not been obtained in a satisfactory state, possibly owing to the high viscosity thereof and the resistance of the same to the disintegrating action of the mill. While emulsions have been obtained containing such excess of bitumen, the dispersion is poor and emulsification is incomplete.

Another consideration in the manufacture of the product or composition of the present invention is the amount of water employed. Owing to the cost of transporation, as little water as possible should be employed consistent with complete emulsification. In the process hereindescribed, the amount of water need not exceed 50% of the total volume of the ingredients employed (although more may be employed) and may be as little as 25% of the total volume of the ingredients. When the oil and bitumen are mixed with water and dispersator in the proportions of three to one, the cross-sections of the compartments 62 and 63 and of the openings 64 and 65 should be likewise proportioned, so that the liquids, when rising at the same rate and being maintained at equal levels therein, as noted, are entering the tray and hopper in the required proportions of 3 to 1.

When a natural oil containing bitumen therein in the required proportions is available, it need not be necessary to artificially mix the mineral oil, such as green tar oil, and the bituminous substances, such as bitumen. For instance, "Norfolk residual oil," containing approximately 30% bitumen by volume, may be employed in the above-described process to make the product or composition.

In lieu of green tar oil, other oils may be employed in the process and product, having the required capacity to emulsify, to dissolve the binding material, and having dust-laying properties. Such oils should be, preferably, mineral oils, such as certain shale oils, and contain other crude oils, for example, paraffine oil or the Norfolk oil above mentioned.

The binding material employed can be any of the bituminous substances prevalent, such as the one herein employed, or certain substances of an asphaltic nature and having the required binding properties and the capacity to emulsify.

The "green tar oil" employed in a normal gas works product after the extraction of anthracene, etc. The bitumen employed met the following requirements:

Melting point (ring and ball) ______ 135° F.
Penetration ___________________ Not under 43
Ductility ____________________________ 100
Fixed carbon ________________________ 17%
Solubility in carbon bisulphide _____ 99.9%

The green tar oil employed was found to contain soluble gases to the extent of 1.085%, water 1%, and tar acids 5%, these materials being considered impurities therein. The first drop of green tar oil as used distilled over at approximately 200° C., and at 320° C. 60% of the same is distilled.

The emulsifying agent, stabilizer or dispersator may be any of those capable of emulsifying the oil and binder and of maintaining the particles thereof in a stable condition, preventing the same from agglomerating or forming a gel. The particular dispersator or emulsifying agent used or the proportions thereof employed will vary with the nature of the oil employed or with the nature of the material to be emulsified. As herein described, however, I prefer to use a soap, such as sodium oleate, although similar substances may be used, such as potassium oleate or gelatine or combinations of such sodium or potassium oleates with gelatine. The emulsifying agent, however, should be such as will cause the emulsification of the oil and bituminous substance in the water.

The sodium oleate is preferably made in situ, commercial oleate not being recommended, as of uncertain constitution, by the admixture of the theoretical quantities of commercial oleic acid and caustic soda to give a 2% solution of neutral soap. Since the fineness of the subdivision of the dispersed phase depends in a large measure on the concentration and on the alkalinity or acidity of the dispersator in use, the latter must be very carefully prepared and used in the correct proportions. The sodium oleate given by way of example and comprising the preferred dispersator is formed by the admixture of the theoretical quantities of oleic acid and causic soda for the normal reaction to take place according to the equation:

$$C_{18}H_{35}COOH + NaOH = C_{18}H_{35}COONa + H_2O$$

The product formed by the above-described process is a colloidal or emulsified preparation of bitumen and a mineral oil for use as a dust preventative for roads mines and the like. The composition is an ideal one for this purpose, as it prevents not only the dispersion of dust already formed, but also retards the formation of further dust by attrition. The first of these functions is filled by the oil in the water by reason of its saturating power, the effectiveness of the oil depending upon the rate of evaporation thereof. The second function is fulfilled by the adhesive or binding qualities of the preparation which are given to it by the bitumen content. From a chemical point of view, the composition of my invention is, it is believed, a colloidal or emulsified solution in which the internal or dispersed phase is a solution or mixture of a bituminous substance, such as bitumen, in an oil, preferably a mineral oil, the latter acting as or like a solvent, and in which the external, continuous or dispersing phase is water containing the necessary emulsifying agent. The finished product is of a light chocolate color, miscible with water in all proportions, from 10 to 20 volumes being addable thereto without detrimental effect. The color, of course, becomes lighter as more water is added. For a given bitumen content, the color will be a rough indication of the quality, since the finer are the subdivisions of the emulsified oils, the lighter will be the color. On standing, little or no separation takes place in the product or composition. Two types of separations may occur when the materials have not been properly mixed or properly prepared. One, the arising to the top of a light colored layer; the other, the settling to the bottom of a darker layer. The former, although undesirable, can be tolerated, as it is a layer of very finely divided but dilute emulsion. The latter, however, cannot be passed, as it consists of a layer in which the particles are coarser globules or are even grains of bitumen. The latter is very unstable and not as miscible in water.

The chief characteristics of the product or composition of this invention are as follows:

A good sample shows, when in a thin film between the slides and cover glass, upon observation through a high-powered microscope, a densely packed mass of distinct particles or globules of diameters approximating the order of magnitude of a small fraction of a millimeter, i. e., 2 to $3 \times 10^{-3}$ mm. or of the order of magnitude required to permit Brownian motion, the particles or the larger portion thereof being in rapid Brownian motion. Dilution with water to equal extents enables the number of particles per given area to be compared between different samples, the particles here being in rapid Brownian motion also. Those samples which show a coarse grain or in which the particles show a tendency to form aggregates will prove unstable and will separate on standing. The composition of my invention, however, when made in accordance with the above-described process and in the proportions herein specified, comprises a stable, colloidal substance or emulsion, miscible in water in all proportions.

The viscosity of the composition, when comprising by volume green tar oil 40%, bitumen 10%, water 49%, and sodium oleate 1%, as above manufactured, is approximately 5.5, as determined by the Ostwald viscometer, and approximately 11 when the bitumen is increased to 15%. As the viscosity increases above that specified, there will be a tendency for the particles to aggregate and for the bitumen to separate.

The 10% bitumen composition above mentioned will not precipitate when five centimeters thereof are added to 10 centimeters of a .25 normal sodium chloride solution, the same remaining unchanged for five minutes. Higher concentrations of sodium chloride solution, however, precipitate the same.

Dilution with water has no effect on my composition when made in accordance with the process above described. The water employed in manufacture, however, should be the minimum required for the complete emulsification of the oil and binding material therein, thereby enabling the cheap transportation of the same. When the material, however, is to be used at its destination, additional quantities of water may be added to any required extent, the composition becoming homogeneous with the water and being miscible therewith in all proportions. This provides a composition which can be placed in any sprinkling cart and applied just like water.

The water employed in the manufacture of the composition of my invention should not be too hard, and an excess of emulsifying agent should not be employed, as the presence of salts or electrolytes beyond a certain concentration tend to precipitate colloidal solutions.

For the above reason, the composition of my invention is modified where it is contemplated to dilute the same with salt water or sea water to sprinkle the same over the road or surface. To permit such use, the presence of gelatine in the composition to the extent of 1% affords protection against the precipitating influences of sea water. In the preparation of the emulsion, therefore, for use with sea water, the gelatine is added as a 2% solution either with sodium oleate in the course of manufacture or preferably it may be added afterwards to the finished product.

The product hereindescribed as manufactured by my process provides a composition for roads, mines, railways and other surfaces of all kinds, which is far superior to the watering and tar-spraying methods heretofore in use, which are imperfect and expensive, and have many disadvantages. My composition is cheaper to use, as it needs not be applied as often, and the distribution is more even and economical. Furthermore, it is easily applied and is non-poisonous and non-slippery. It is applied by mixing therewith from 10 to 20 times its bulk of water and sprinkling the same on the roads with an ordinary sprinkling cart. The liquid soaks into the road, the water evaporates, and the bitumen and oil remain. When applied, the same prolongs the life of the road, prevents cracking thereof and the wearing away thereof. The same does not adhere to vehicles nor cause inconvenience to pedestrians.

My composition is manufactured with varying proportions of binding material. When a light dust dressing is desired, the biutmen content is less. In the case of water bound macadam, gravel roads, etc., in poor repair a maximum quantity of bitumen is included, affording greater binding property.

The penetration of my composition is virtually that of water as also is its specific gravity. It penetrates where water will go, leaving the oils permeated within the surface, coating and binding each particle of the surface with oils and bitumen.

By reason of the efficiency of the same in laying dust, it is invaluable from a health standpoint, the green tar oil also being a disinfectant.

My composition when applied to roads is not sticky or slippery. Hence, traffic and lives are not endangered thereby by skidding. Nor is the same tracked into houses, thereby ruining carpets and floors.

Furthermore, by reason of the well proportioned constituent oil and binding materials, the same does not become dust upon drying but remains on the road and does not run off polluting streams.

Furthermore, my composition, which is non-inflammable, is especially valuable for use in mines to prevent explosions and fires. For this purpose, the passageways in the mines are swept, and my composition is sprayed in a moderate solution with water on the floors and walls. The coal dust is thoroughly prevented thereby from causing explosions, etc.

I claim:—

1. The hereindescribed process of disintegrating matter dispersed in a liquid which consists in subjecting said liquid together with said matter to the mechanical action of a mill to cause the disintegration of said matter while continuously maintaining a head of liquid above said mill to form a liquid seal therefor, and continuously supplying said liquid and said matter to said head to maintain the same at the desired level and to insure a steady flow through said mill, substantially as specified.

2. The hereindescribed process of disintegrating matter dispersed through a liquid which consists in continuously passing said liquid together with said matter as a very thin film through a small clearance between opposing smooth surfaces of closely arranged non-contacting members suitably enclosed and relatively movable one past the other at high velocity, and continuously maintaining a substantially constant head of the liquid above the level of said members to provide a liquid seal therefor and the pressure of the air within the enclosure at substantially that above said head to insure a steady flow of liquid through said clearance, and thereby subjecting the film as the same continuously passes through said clearance to the shearing action of said members to slightly retard the ejection of said film from between said members to increase the disruptive forces acting on said film, whereby to disintegrate said matter by said disruptive forces which increase with the increase of the relative velocities of said members, and decrease with the increase in the width of said clearance, substantially as specified.

3. The hereindescribed process of disintegrating matter dispersed in a liquid which consists in running the liquid together with said matter through a small clearance between enclosed members relatively rotating at a high speed to subject said matter to the disruptive action of said relatively rotating members to cause the disintegration thereof, and continuously maintaining a head of the supply liquid above the level of said members to provide a liquid seal therefor and the pressure of the air within the enclosure at substantially that above said head to insure a steady flow through said clearance, and continuously supplying said liquid and said matter to said head at such a rate as to maintain the same at the desired level, substantially as specified.

4. The hereindescribed process of disintegrating matter dispersed in a liquid which consists in taking said liquid and said matter from separate sources, continuously running and combining the parts in the desired proportions, and then subjecting the continuously running combined parts to the mechanical action of a mill to cause the disintegration of said matter while continuously maintaining a head of supply liquid above said mill to form a liquid seal therefor and to insure a constant flow therethrough, substantially as specified.

5. The hereindescribed process of disintegrating matter dispersed in a liquid which consists in passing the liquid with the matter dispersed therein through a small clearance between enclosed members relatively rotating at a high speed to subject said matter to the shearing action of said members to cause the disintegration thereof, and continuously maintaining a head above the level of said members composed of said liquid and said matter in separated relation to form a liquid seal and the pressure of the air within the enclosure at substantially that above said head to insure a steady flow through said clearance, and continuously supplying said liquid and said matter separately to their respective head portions at such a rate as to maintain said head at the desired level and to prevent overloading, substantially as specified.

6. The hereindescribed process for making emulsions, which consists in placing the dispersable phase and the continuous phase in tanks, running said phases from said tanks into a proportioning hopper and so adjusting the flow thereof as to cause the same to combine in said hopper in the required proportions for emulsification, and then running the combined phases through a small annular clearance between relatively rapidly rotating concentric members, while continuously maintaining a head of supply liquid above the level of said members to insure a steady flow therebetween and to provide a liquid seal to prevent the entrance of air therethrough, substantially as described.

7. The hereindescribed process for making emulsions, which consists in separately heating the dispersable phase and the continuous phase, continuously running said phases into a proportioning hopper and adjusting the flow thereof to cause the same to combine in proportions for emulsification, and then continuously running said combined phases through a small clearance between concentric relativly rotating enclosed members, while continuously maintaining a head of supply liquid above the level of said members and the pressure of the air within said enclosure at substantially that above said head, substantially as described.

8. The hereindescribed process for making emulsions, which consists in separately heating the dispersable phase and the continuous phase, the constituents of said phases being so proportioned as to be in the required relative quantities for emulsification when combined in substantially equal columes, continuously running said heated phases into a proportioning hopper and adjusting the flow thereof to cause the same to combine in substantially equal volumes, and then continuously running said combined phases while heated through a small clearance between enclosed relatively rapidly rotating concentric members, while continuously maintaining a head of liquid in said hopper above the level of said members and the pressure of the air within said enclosure at substantially that above said head, substantially as described.

9. The hereindescribed process for making emulsions, which consists in separately heating oil and water with a small amount of an emulsifying agent therein, continuously running the same into a proportioning hopper and adjusting the flow thereof to cause the same to combine therein in the required proportions for emulsification, and then continuously running said combined liquids through a small clearance between relatively rapidly rotating concentric members, while continuously maintaining a head of liquid in said hopper above the level of said members, substantially as described.

10. The hereindescribed process for making emulsions, which consists in heating the dispersable phase, comprising a mineral oil and a bituminous substance, and the continuous phase, comprising water and an emulsifying agent, separately, continuously running said phases into a proportioning hopper and adjusting the flow thereof to cause the same to combine in proportions for emulsification, and then continuously running said combined phases through a small clearance between enclosed concentric relatively rapidly rotating members, while continuously maintaining a head of supply liquid above the level of said members and the pressure of the air within said enclosure at substantially that above said head, substantially as described.

11. The hereindescribed process for making emulsions, which consists in placing a mineral oil and a bituminous substance in a tank in proportions permitting the thorough dispersion of the latter in the former and heating the same until homogeneous and liquid, heating in a separate tank water and an emulsifying agent in a quantity by volume approximately the volume of said oil and bituminous substance, said emulsifying agent being quantitatively proportioned to aid emulsification, continuously running the heated contents of said tanks into a proportioning hopper and adjusting the flow thereof to cause said contents to combine therein in substantially equal quantities by volume, and then continuously running said combined liquids while heated from said hopper upwardly into an emulsifying mill, through a small clearance, between concentric conical members relatively rapidly rotating, while continuously maintaining a head of liquid above the level of said members for continuously supplying said liquids thereto when the adjustments are made and to provide an air seal, substantially as described.

12. The hereindescribed process for making emulsions, which consists in heating to a temperature of about 100° C. a mixture of mineral oil and a bituminous substance in proportions permitting the thorough dispersion of said substance throughout said oil, separately heating to substantially the same temperature a mixture of water and an emulsifying agent in proportions permitting the emulsification therein of said oil and said bituminous substance, continuously running said mixtures into a proportioning hopper and adjusting the flow thereof to cause the same to combine in said hopper in substantially equal quantities by volume, and then continuously running said combined mixtures while heated, through a clearance of the order of magnitude of approximately from 5/1000ths to 25/1000ths of an inch, between enclosed concentric conical members relatively rotating at a speed approximately of the order of magnitude of from 3,000 to 5,000 revolutions per minute, while continuously maintaining a head of liquid in said hopper above the level of said members and the pressure of the air within said enclosure at approximately that above said head, substantially as described.

13. The hereindescribed process for making emulsions, which consists in mixing green tar oil and bitumen in the proportions of approximately 480 parts by volume of green tar oil and 120 parts by volume of bitumen and heating the same in a tank at a temperature of approximately 100° C. for about one hour, mixing water and sodium oleate in the proportions of approximately 588 parts by volume of water and 12 parts by volume of sodium oleate and heating the same in a separate tank at a temperature of about 98° C. for about an hour, running said liquids from said tanks and combining the same while running approximately in equal amounts by volumes, and then running said combined liquids while heated upwardly, through a clearance of the order of magnitude of approximately 15/1000ths of an inch, between preheated conical members relatively rotating at a speed of approximately 4,500 revolutions per minute, while continuously maintaining a head of liquid above the level of said members to maintain an even flow therebetween, substantially as described.

14. The hereindescribed process for making emulsions, which consists in combining an oil having a dust-laying property and a bituminous substance having a binding property and a liquid comprising water and an emulsifying agent, and then continuously running the same through a small clearance between enclosed concentric members relatively rotating at a high speed, while continuously maintaining a head of liquid above the level of said members and the pressure of the air within said enclosure at substantially that above said head, substantially as described.

15. The hereindescribed process for making emulsions, which consists in combining a liquid comprising a mineral oil and a bituminous substance, the same beng in proportions permitting the dispersion of said bituminous substance in said oil and optimum emulsification, with a liquid comprising water and an emulsifying agent in a quantity sufficient to permit emulsification of said first-named liquid therein, and then continuously running said combined liquids through a clearance approximately the order of magnitude of from 5/1000ths to 25/1000ths of an inch between enclosed concentric conical members rotating at a speed approximating the order of magnitude of from 3,000 to 5,000 revolutions per minute, while continuously maintaining a head of liquid above the level of said members and the air pressure within said enclosure at approximately that above said head, substantially as described.

16. The hereindescribed process for making emulsions, which consists in combining a liquid comprising a mineral oil and a bituminous substance, said bituminous substance not exceeding approximately 45% of said liquid by volume, with a liquid comprising water and an emulsifying agent in a quantity by volume at least approximately equal to 1/3rd of the volume of said first-named liquid and which need not exceed a volume equal to the volume of said first-named liquid, and then continuously running said combined liquids through a clearance approximately the order of magnitude of from 5/1000ths to 25/1000ths of an inch between enclosed concentric conical members rotating at a speed approximately the order of magnitude of from 3,000 to 5,000 revolutions per minute, while continuously maintaining a head of liquid above the level of said members and the air pressure within said enclosure at substantially that above said head, substantially as described.

HARRY L. SYMONS.